Nov. 28, 1939.  T. B. PRICKETT  2,181,153
REACTION VESSEL
Filed March 15, 1937  2 Sheets—Sheet 1
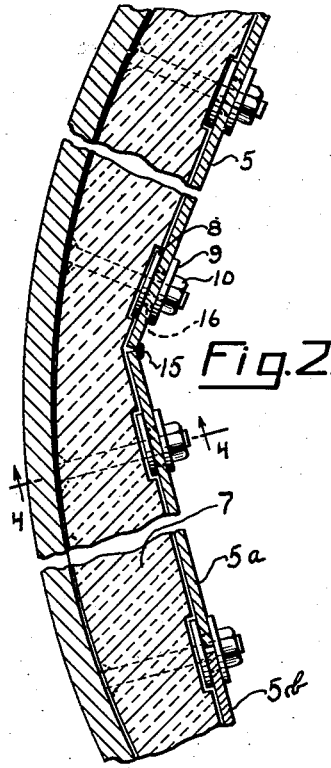
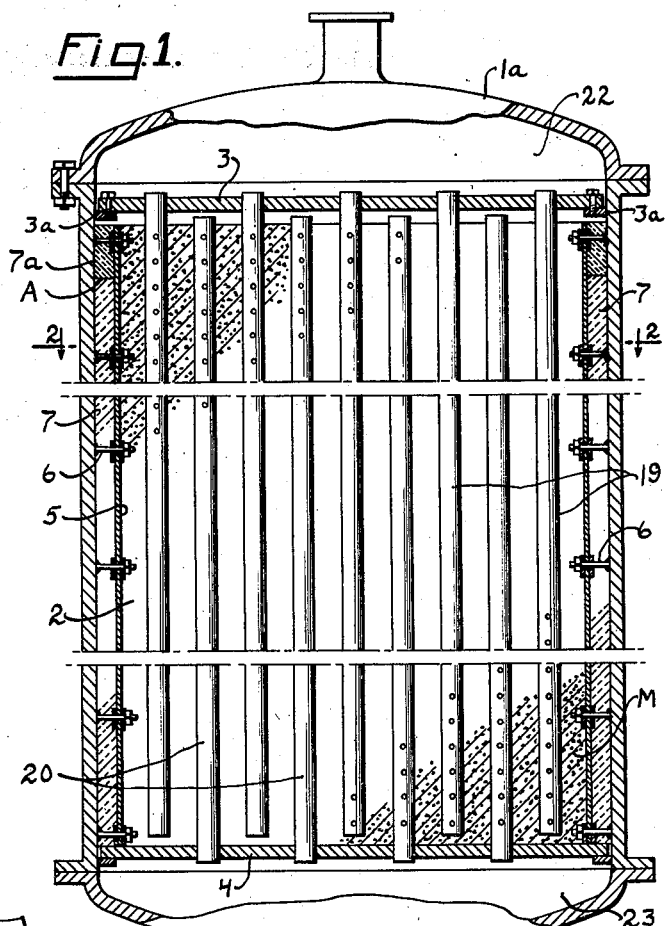
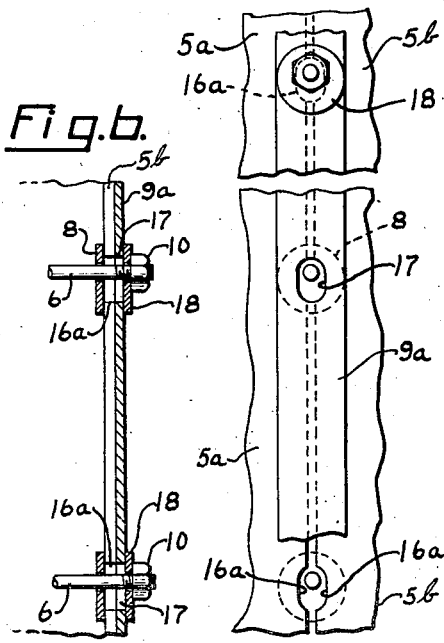
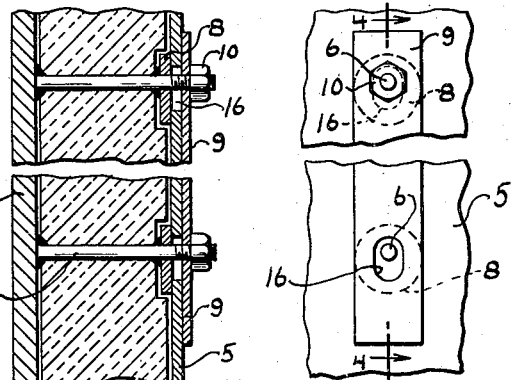
INVENTOR
Thomas B. Prickett
BY
Ira L. Nickerson
ATTORNEY

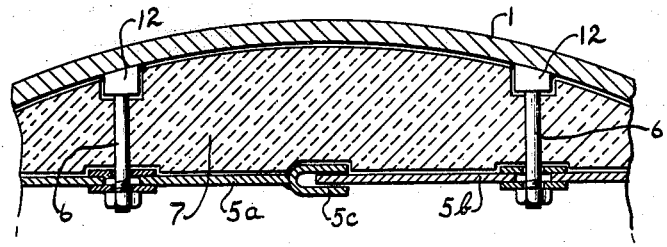
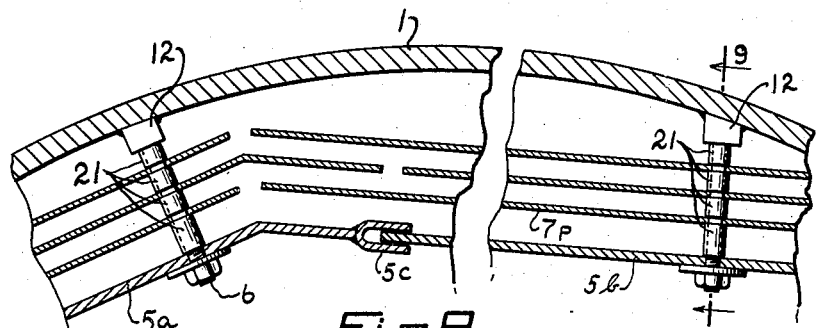
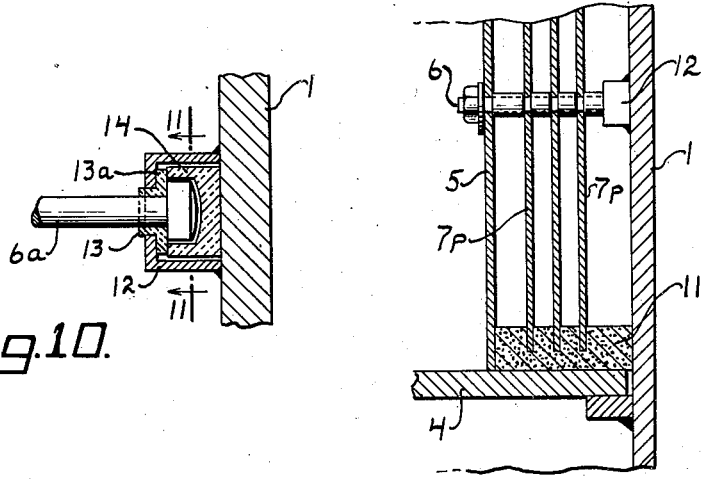
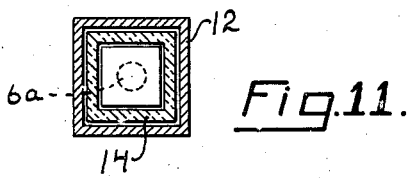

Patented Nov. 28, 1939

2,181,153

UNITED STATES PATENT OFFICE 2,181,153

REACTION VESSEL

Thomas B. Prickett, Woodbury, N. J., assignor to Houdry Process Corporation, Wilmington, Del., a corporation of Delaware Application March 15, 1937, Serial No. 130,827

13 Claims. (Cl. 23—288)

The present invention relates to converters or fluid treating apparatus for effecting contacting or chemical reactions or treatment of fluids by or in the presence of a contact material, which may promote, enter into or in any way assist in the chemical or physical treatment of fluids.

It is an object of my invention to improve a converter or like fluid contacting apparatus so that the outer or boundary portions of contact material, within the contacting or reaction chamber thereof, will be maintained at desired temperatures while the apparatus is in use and, at the same time, deleterious strains in the apparatus will be avoided. Another object is to provide an inner shell within the converter shell and in spaced relation to the inner face of the latter. Another object is to provide insulating means between such inner shell and the wall of the converter so that the wall or casing of the converter, the inner shell, and the heat insulating means can each expand or contract independently of one another. A further object is to prevent or minimize heat conduction between the reaction chamber and the converter wall through the inner shell. A still further object is to substantially exclude or prevent fluid from coming in contact with the heat insulating means located between the inner shell and the converter wall, and to keep fluid at or near reaction temperature from coming into contact with the inner face of the converter shell. These and other objects and advantages will become apparent from the detailed discussion which follows.

In certain respects the present invention may be considered as a modification or further development of Patent No. 1,992,946, issued on March 5, 1935, to James W. Harrison, and of my copending application Serial No. 4,505, filed Feb. 1, 1935, which issued on September 7, 1937, as Patent No. 2,092,017.

An understanding of the invention can be facilitated by reference to the illustrative embodiments thereof shown in the accompanying drawings in which:

Fig. 1 is an elevational view partly in section of a converter for effecting a contact or catalytic treatment of fluids;

Fig. 2 is a fragmentary sectional plan view taken on line 2—2 of Fig. 1;

Fig. 3 shows in elevation a portion of the structure of Fig. 2;

Fig. 4 is a sectional view taken on line 4—4 of Figs. 2 and 3;

Fig. 5 shows a modified form of the type of structure shown in Fig. 3;

Fig. 6 is a fragmentary sectional view of Fig. 5;

Fig. 7 shows a view somewhat similar to that shown by Fig. 2 but illustrates a modified type of inner shell;

Fig. 8 illustrates a modification of the structure shown in Fig. 7;

Fig. 9 is a fragmentary elevational view shown partly in section and taken substantially on line 9—9 of Fig. 8;

Fig. 10 is a fragmentary elevation of a portion of the converter shell or wall showing an advantageous method of mounting the bolt or equivalent means for holding the inner shell in desired relation to the wall or shell of the converter; and Fig. 11 is a sectional view taken on line 11—11 of Fig. 10.

Referring more in detail to the drawings, in the several figures of which like reference characters denote similar parts, 1 is a casing providing a reaction chamber 2 bounded at its upper and lower ends by perforated partition members 3 and 4, respectively, which also define the extent of manifolding chambers 22 and 23. Reaction chamber 2 may contain a contact mass M in which there may be embedded one or more series of perforated conduits 19 and 20 for distributing fluid reactants through and/or for removing reaction products from mass M. If desired, one of said series of conduits may be imperforate and may serve to conduct a heating or cooling fluid in heat exchange relation with mass M, or, such imperforate conduits may be the only conduits extending into reaction chamber 2, in which case, reactants may be admitted to chamber 2 through suitable openings in one of the partitions 3 or 4 while reaction products may be discharged through the other of said partitions. Uniformity of control of the temperature conditions within reaction chamber 2 is aided when the conduits embedded in mass M are arranged in substantial parallelism and in symmetrical order so as to form a definite geometric cross-sectional pattern. An inner shell or lining 5, formed of sheet metal or the like extends continuously around the entire interior wall of the converter and is held in spaced relation therewith at frequent intervals by a plurality of series of suitable fastening means such as bolts or studs 6. Inner shell 5 may assume approximately or substantially the same contour as the cross-sectional pattern of the conduits extending into reaction chamber 2. Suitable insulating means, preferably a solid formed body, as for example an insulating cement 7 lines the wall of converter 1 to substantially fill the space between that wall and the inner shell 5 and is capped with a layer of impervious material 7a which may be an impervious cement.

In applying the layer or lining of insulating cement referred to above, to the inner wall of the converter shell, the inner walls of the converter 1 and the surfaces of inner shell 5 which face the same are each coated with a thin layer or film of grease, wax, oil or the like and then a suitable cement, for example, a mixture of Portland cement and diatomaceous earth with or without asbestos or magnesia fibre, in suitable proportions, together with enough water to render the mixture plastic, is poured between the inner wall of the converter and the inner shell 5 until it rises to the level A, which is a point near but slightly spaced from the top of the reaction chamber. Specifically this cementitious material or insulating cement may be made of one or two parts of Portland cement, for example, to each three or four parts of a diatomaceous earth such as kieselguhr.

During the pouring of this plastic material, partition member 3 (which is shown as bolted to support 3a) may be removed and also, where desired, the upper head 1a of the converter 1 may also be removed.

Following the introduction of material 7, a material in plastic form which sets to form an impervious fluid-tight layer 7a is introduced directly on the top of material 7. Some time is usually allowed, in which setting of material 7 is initiated, before the layer 7a is applied. Material 7a may consist, for example, of any practically non-porous cementitious material of good insulating properties which will set to form a hard and impervious layer. For example, a slurry of insulating cement, which comprises or contains a high proportion of Portland cement mixed with powdered or fibrous insulating material, will harden into a suitably hard and impervious coating.

Although not shown in the drawings, there may be a thin layer of impervious cement directly above partition 4 to provide a fluid seal between that partition and inner shell 5. Preferably such cement is a mixture which hardens to a tough structure capable of being subjected to high temperature without cracking, and may be obtained from suitable mixtures of Portland cement and diatomaceous earth.

As setting of the plastic insulating material between the inner shell and casing (which have been pre-coated with grease, wax, etc.) takes place, such material shrinks and becomes slightly spaced from the coated surfaces of inner shell 5 and of the inner wall of the converter 1, as indicated in Figs. 2, 4 and 7. This spacing between these elements of apparatus permits inner shell 5, insulating material 7 and 7a and the adjacent wall of converter 1, each to expand and/or contract independently of the other and without setting up strains in each other.

The exterior surface of the walls of the converter 1 may or may not be covered with an insulating material, as desired. Such an external covering of insulation is often unnecessary but may be desirable where high temperatures are being employed in the reaction chamber and, where desirable, the use of such is contemplated.

Figs. 2 to 11, inclusive, illustrate details of inner shell 5 and of methods of mounting the same within the converters. Inner shell 5 may comprise a continuous member made from a single formed or bent sheet having a suitable contour or may be provided by rigidly fastening together a plurality of suitably shaped sheets, for example, by welded joints as indicated at 15 in Fig. 2; or, inner shell 5 may comprise a plurality of sections each of which is free to move in both longitudinal and circumferential directions with respect to its neighbor. In order to realize such freedom of movement, neighboring sections may terminate in aligned and spaced relation between or under suitable fastening means, but preferably under such means, as illustrated for example by sections 5a and 5b in Fig. 2, which terminate in alignment with a row of bolts 6 to leave a space or open seam therebetween. When it is desired to have a section of the inner shell terminate between fastening means, one of such sections may be provided with suitable means for slidably receiving the next adjacent section and for minimizing leakage of fluid into the space between shells 1 and 5. For example, section 5a may have attached thereto a U-shaped member 5c which slidably receives a section 5b, as indicated in Figs. 7 and 8.

Whether inner shell 5 is composed of a single section or a plurality of sections, it is mounted in desired spaced relation to converter shell 1 so that it is free to move with respect to the latter as well as with respect to insulating means interposed therebetween. To accomplish this, shell 5 is provided with slots 16 through which bolts 6 extend and is rather loosely held against inner washers 8 attached to bolts 6 by outer washers 9 and nuts 10. As illustrated in Figs. 3 and 4, inner washer 8 may be eccentric and outer washer 9 may take the form of an elongate perforated plate which receives two or more of the bolts 6 and serves as retaining means for a substantial portion of the length of inner shell 5. When inner shell 5 comprises a plurality of sections, such as 5a and 5b in Fig. 2, which terminate under fastening or retaining means, such as washers or plate 9, each section preferably provides matched half slots, such as 16a in Figs. 5 and 6, which receive bolts 6. In such instances, the retaining plate 9a may extend for substantially the complete length of inner shell 5 in order to cover the space between sections 5a and 5b, thereby to avoid or minimize passage of fluid between such sections. When this is done, plate 9a may be provided with slots 17 in alignment with slots 16 and which are covered by additional washers 18 located under nuts 10. In place of a solid type of insulating material such as above described, the solid, formed insulating means or material located between inner shell 5 and the wall of converter 1 may consist of heat baffles or metal plates 7p (Figs. 8 and 9). These heat baffles, which may consist of a single or a multiple layer, are spaced from the inner shell 5 and also from the walls of the converter 1 by spacing members or spools 21. As can be seen more clearly by referring to Fig. 9, it is usually desirable to embed the lower ends of heat baffles 7p in a suitable impervious cement 11 which serves substantially to exclude the passage of fluid from the reaction chamber between the inner shell 5 and the partition member 4 and into contact with the wall or casing 1 of the converter.

Although not specifically shown in the drawings, a small drain hole or series of drain holes 7 may be provided through inner shell 5 above and adjacent the upper surface of the layer of material 11. However, the upper end of the space between inner shell 5 and the inner wall of converter 1 may be closed by use of metal plates or the like so as to retard or exclude the entry of fluid.

The considerable total cross-sectional area of bolts 6 permits substantial loss of heat by conduction from reaction chamber 2 to the shell of the converter. In some instances, the amount of heat lost in this manner is sufficient to upset the desired temperature conditions within chamber 2. To avoid such heat loss and consequently to improve temperature control within the reaction chamber, bolts 6 may be insulated from the shell of the converter. To this end, the heads of bolts 6 may be enclosed in suitable insulating means 12 indicated diagrammatically in Figs. 7, 8 and 9 and illustrated in detail in Figs. 10 and 11. This member 12 is fastened to the wall of converter 1 and has an opening in the inside face thereof of sufficient size to accommodate insulating washer 13, which has a flaring head 13a. Bolt 6a is adapted to fit within the insulating washer 13 with the head thereof resting against the flaring end 13a of the insulating washer. The space around the head of bolt 6a within the member 12 may be filled with concrete or other solid or insulating material, or not, as desired. An insulating or solid material 14 within member 12, which is adapted further to insulate the head or bolt 6a from the converter shell and also to hold the bolt 6a in fixed position during assembly or disassembly of the inner shell 5 may comprise a molded piece adapted to be inserted in place after bolt 6a has been properly located within member 12 and prior to fastening the latter to the wall of the converter.

It will be obvious that the foregoing specific illustrations of my invention are not given by way of limitation but are to be taken in connection with the statement of the broad purpose and objects of my invention and when so taken it will be apparent that a number of other modifications and variations of the specific structure shown are within the purview of this specification and of the claims which follow.

What I claim is:

1. In a converter providing a reaction chamber, an outer casing, an inner shell providing the peripheral boundary of said chamber disposed in spaced relation with said casing, said shell comprising a plurality of separately mounted and movable sections forming a substantially continuous wall, and insulating means spaced from said casing and from said shell disposed therebetween, thereby to provide freedom of movement of said casing, wall and insulating means with respect to each other and all other portions of the converter structure.

2. In a converter providing a reaction chamber, an outer casing, a plurality of successively disposed separate sections forming a substantially continuous and endless shell therewithin enclosing said chamber, means associated with said casing slidably engaging certain of said sections and holding said shell in predetermined and fixed spaced relation therewith while permitting freedom of movement of each section with respect to said casing, and a rigidly formed body of heat insulating material including cement disposed between said shell and said casing and spaced from each.

3. In a converter for effecting chemical reactions, a casing, a plurality of successively disposed sections forming a substantially continuous wall therein enclosing a reaction chamber, means attached to said casing slidably engaging the faces of certain of said sections holding said wall in fixed and predetermined spaced relation with said casing and permitting freedom of movement of said wall with respect to said casing, and heat baffling plates spaced from both said wall and said casing interposed therebetween.

4. In combination, in a chemical converter, a casing, a series of separate and successively disposed apertured plates forming an endless and substantially continuous shell therewithin, spacing members extending from said casing and through apertures provided at intervals in said shell adapted to hold the latter in fixed and predetermined spaced relation with said casing while permitting freedom of movement of each plate with respect to said casing, said members comprising bolts having stop members thereon slidably engaging the inner and outer faces of said plates, receptacles attached to said casing receiving the heads of said bolts, insulating means disposed between said bolts and the walls of said receptacles, and insulating means disposed between said shell and said casing and spaced from both.

5. In combination, in a converter, a casing providing a reaction chamber for containing a contact mass, a plurality of conduits extending into said chamber in substantially symmetrical relation, a series of separate and successively disposed apertured plates forming a substantially continuous and endless inner shell conforming substantially to the geometrical pattern of said conduits, adjacent plates terminating in aligned and spaced relation to leave an open seam therebetween, bolts extending from said casing, certain of said bolts being received by apertures in certain of said plates and having stop members thereon slidably engaging the inner and outer faces of the plates thereby to hold the same in fixed and predetermined spaced relation with said casing while permitting freedom of movement of each plate with respect to its neighbors and to said casing, others of said bolts extending through said open seams and having elongate stop members thereon slidably engaging adjacent plates and presenting substantially continuous surface against said seams, thereby to provide substantially fluid tight and slidable joints between adjacent plates.

6. In combination, in a converter for effecting chemical reactions, a casing containing a reaction chamber, a series of conduits extending into said chamber in substantially symmetrical relation, an inner shell extending continuously around said chamber and conforming substantially to the geometrical pattern of said conduits, said shell comprising a series of separate and successively disposed apertured plates, spacing members extending from said casing and loosely received by apertures in certain of said plates, said spacing members having stop members thereon in slidable and substantially fluid tight engagement with the inside and outside surfaces of said plates, and formed, solid heat insulating means disposed between said shell and said casing and spaced from both, thereby to provide a structure wherein the casing and inner shell are in fixed and predetermined spaced relation at all times and the casing, shell and insulating means are all free to move with respect to each other.

7. In a converter, a casing providing a reaction chamber, series of fluid conduits extending into said chamber in interspersed and substantially symmetrical relation, an inner shell within said chamber conforming substantially to the geometrical pattern of said conduits and spaced from said casing, said shell comprising a plurality of separate and successively disposed apertured plates, heat baffle plates interposed between said shell and said casing and spaced from each, a layer of hard, fluid impervious, plastic material disposed adjacent one end of the space between said casing and said shell sealing said space from the remainder of said chamber, spacing members attached to said casing and loosely received by apertures in each of said plates, stop members on said spacing members in slidable and substantially fluid tight engagement with the inner and outer faces of said plates, thereby to provide a structure wherein said shell and casing are in fixed and predetermined spaced relation at all times and are free to move with respect to each other.

8. In combination, in a converter, a casing providing a reaction chamber, conduits extending into said chamber in spaced geometric relation, an inner shell conforming substantially to the geometric pattern of said conduits extending substantially the length of and entirely around said chamber and providing a peripheral space opening at one end into said chamber, said shell comprising a number of separate and successively disposed plates, spacing and fastening means attached to said casing and extending across said space slidably engaging each of said plates and holding the same in fixed and predetermined spaced relation with said casing while permitting freedom of movement of said plates, a solid, formed heat insulating body disposed between and spaced from said shell and casing, and a fluid impervious seal disposed in said space adjacent said open end.

9. In a converter providing a reaction chamber, an outer casing, an inner shell providing the peripheral boundary of said chamber, said inner shell comprising a plurality of independently and movably mounted sections forming a substantially continuous wall, and spacing members extending between said casing and certain of said sections, said members being attached to said casing and slidably holding said shell in fixed and predetermined spaced relation therewith.

10. In a converter for effecting chemical reactions, in combination, an outer casing, a series of plates forming a substantially continuous wall therewithin providing the peripheral boundary of a reaction chamber, adjacent plates terminating in aligned and spaced relation to leave an open seam therebetween, spacing and fastening members adapted to hold said plates in fixed and predetermined spaced relation with said casing attached to the latter and slidably received by each of the former, and sealing means extending across said open seams and slidably engaging at least one of the adjacent plates, thereby to provide a structure wherein each section of said inner shell is free to move with respect to its neighbors and to said casing.

11. In a converter for effecting chemical reactions, in combination, an outer casing, a series of plates forming a substantially continuous wall therewithin providing the peripheral boundary of a reaction chamber, adjacent plates terminating in aligned and spaced relation to leave an open seam therebetween, spacing and fastening members adapted to hold said plates in fixed and predetermined spaced relation with said casing attached to the latter and slidably received by each of the former, and U members attached to certain of said plates to extend across said open seams and slidably receive the adjacent plates, thereby to provide a substantially fluid tight inner shell each section of which is free to move with respect to its neighbor and said outer casing.

12. In a converter providing a reaction chamber, an outer casing, an inner shell providing the peripheral boundary of said chamber disposed in spaced relation with said casing, said shell comprising a plurality of separate and movable sections forming a substantially continuous wall, insulating means spaced from said casing and from said shell disposed therebetween, and means extending between said casing and said shell movably holding the latter in fixed and predetermined spaced relation with the former, thereby to provide freedom of movement of said casing, said shell and said insulating means with respect to each other and freedom of movement of said sections with respect to each other.

13. In a converter for effecting chemical reactions, a casing providing a reaction chamber, a plurality of conduit members extending into said chamber in substantially symmetrical relation, an inner shell spaced from said casing providing the peripheral boundary of said chamber, said inner shell comprising a plurality of separately mounted and movable sections forming a substantially continuous wall having contour adapted to the geometric pattern of said conduits, insulating means spaced from said casing and said wall disposed therebetween and spacing means extending at intervals between said casing and said shell, said members holding said casing and said shell in fixed and predetermined spaced relation whilt permitting movement of said sections and of said insulating means with respect to each other and to said casing.

THOMAS B. PRICKETT.